Nov. 13, 1945.                H. WALKER                2,389,096
                            BRAKE MECHANISM
                       Filed March 10, 1945          2 Sheets-Sheet 1

INVENTOR:
Howard Walker,
BY  Paul & Paul
            ATTORNEYS.

Nov. 13, 1945.   H. WALKER   2,389,096
BRAKE MECHANISM
Filed March 10, 1945   2 Sheets-Sheet 2
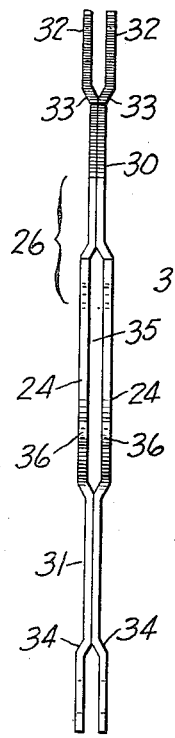
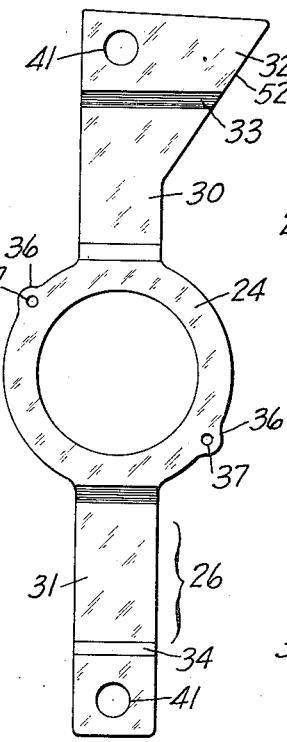
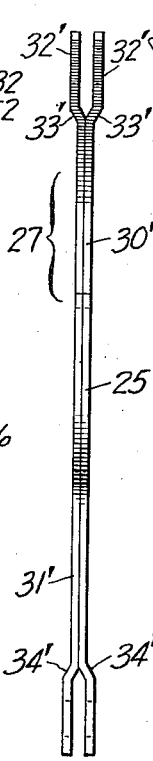
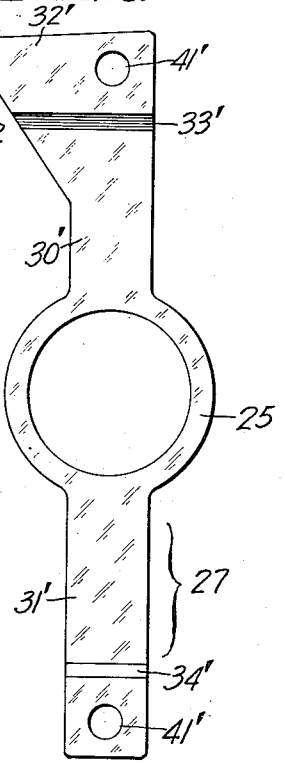
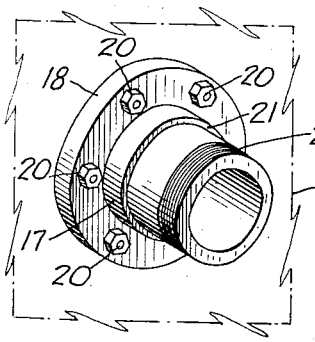
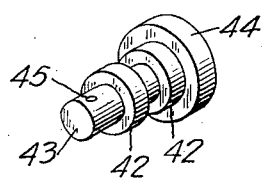
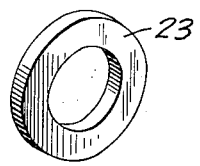
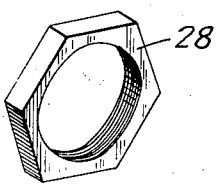
INVENTOR:
Howard Walker,
BY Paul & Paul
ATTORNEYS.

Patented Nov. 13, 1945

2,389,096

UNITED STATES PATENT OFFICE 2,389,096

BRAKE MECHANISM

Howard Walker, Philadelphia, Pa.

Application March 10, 1945, Serial No. 581,978

4 Claims. (Cl. 188—78)

This invention relates to brake mechanism, while it has more particular reference to the species commonly used on motor vehicles and including friction elements, with associated actuating means whereby said elements are concurrently and radially shifted into active position and retracted therefrom. Brakes of the type referred to in time are liable to get out of order and become defective as regards the braking effort exerted, due to the development of irregular wear on such friction elements.

An important object of this invention is to provide an improved form of brake construction, of the above indicated species, wherein the friction elements or shoes are so operated as to ensure uniform wear on said shoes; and wherein such shoes are directly activated irrespective of the direction in which the braking pressure is exerted.

Another object is the provision of a brake mechanism of the above typified form wherein the braking pressure is circumferentially and uniformly applied to the brake-drum.

Other objects, with ancillary advantages, of this invention will be manifest from the following detailed description of the preferred embodiment thereof, shown by the accompanying two sheets of illustrative drawings, wherein like reference characters designate corresponding parts in all the views; while the concluding claims, more particularly, define the features of novelty over the prior art.

In the drawings:

Fig. 3 is an edge elevational view of one of a pair of counterpart brake-shoe supporting arms or levers; and Fig. 4 is a side or face view of the same as seen looking from the right toward the left hand of Fig. 3.

Fig. 5 is a similar elevational view to Fig. 3 of the other of said pair of brake-shoe supporting arms or levers; and Fig. 6 is a corresponding view to Fig. 4 of Fig. 5, or as seen when looking from the left towards the right hand of said Fig. 5.

Fig. 7 is a perspective view of a pivot bearing means, hereinafter fully explained.

Fig. 8 is a perspective view of the hub portion of the improved brake mechanism herein disclosed.

Fig. 9 is a perspective view of one of a pair of spaced collars or washers; and

Fig. 10 is a similar view of an associated locknut; all of said parts being hereinafter further explained.

Figure 1:
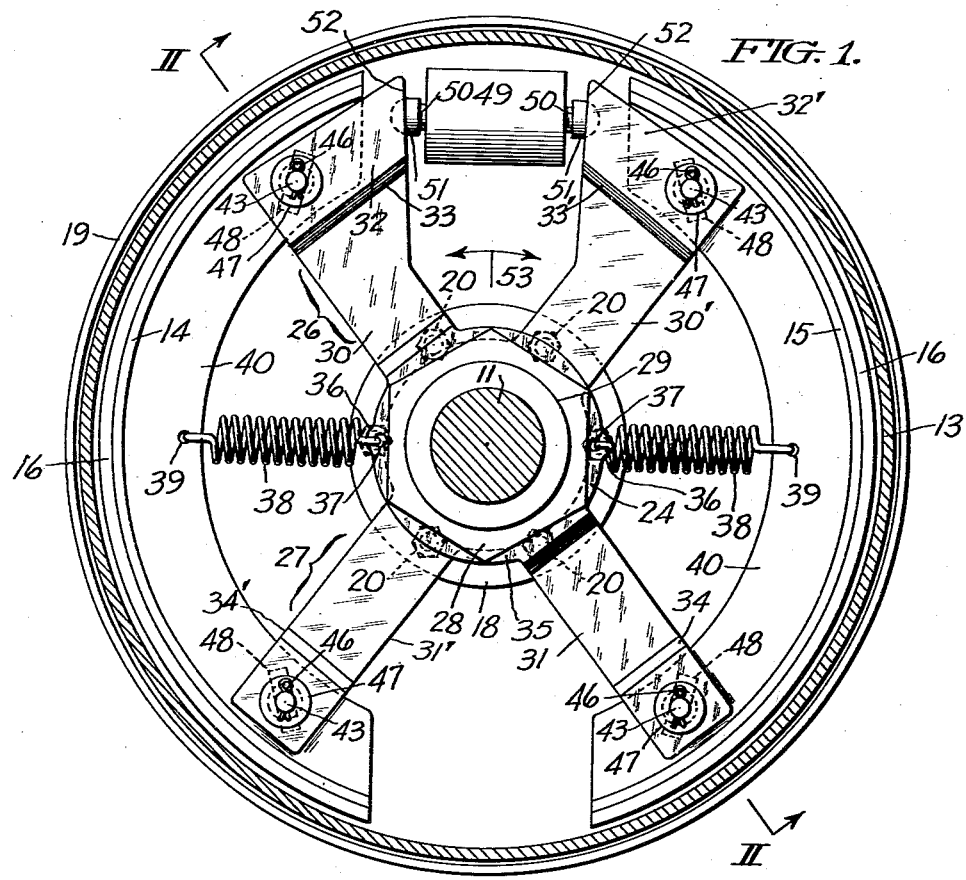
Fig. 1 is a vertical sectional view of a brake mechanism constructed in accordance with this invention, said view being on the plane designated by the angled arrows I—I in Fig. 2.

In describing the form of this invention exemplified by the drawings, specific terms will be employed for the sake of clarity, but it is to be understood the scope of said invention is not thereby limited; each such term being intended to embrace all equivalents which perform the same function for an analogous purpose.

Referring more in detail to the drawings the reference character 11 designates a fragmentary portion of a conventional motor vehicle wheel-axle having a collar or shoulder 12 to which the rotary brake-drum 13 is rigidly secured, and with the inside cylindrical face whereof a pair of opposingly-located arcuate brake-shoes 14, 15, having suitable lining elements 16, are designed to coact.

The brake-shoes 14, 15 are jointly supported, in opposed relation, by means of a bearing sleeve 17—Fig. 8—having a flange 18, at one end, for rigid fixture thereto of the back-pan or closure 19, as by clamp-bolts 20. The sleeve 17 is preferably reduced in diameter along its outer portion to provide a shoulder 21 for abutment by a collar 22 between which, and a washer 23, the hub portions 24, 25 of the brake-shoe supporting units or actuator-levers 26, 27 respectively, Figs. 3–6, are pivotally mounted and held in position by a locknut 28 engaged on the screw-threaded outer end 29 of said sleeve 17.

The actuator-lever 26, as best understood from Figs. 3 and 4, preferably comprises mating sheet metal elements each of which embodies, in addition to the planarly-stepped hub-portion 24, a pair of diametrically extending arms 30, 31. Each arm 30 includes a wedge-shaped section 32, outset at 33 into the plane of the hub-portion 24 so as to provide a bearing fork; whereas the arm 31 is formed with an outset 34 correspondingly in the plane of said hub-portion to define a second bearing fork. Inasmuch as the actuator-lever 27, of Figs. 5 and 6, is approximately a counter-structure with respect to the lever 26, corresponding parts are designated by like reference characters with an added prime exponent for the purpose of illustrative differentiation only. Note is to be had, however, that the hub-portions 25 are conveniently of smaller outer diameter than the hub-portions 24, of said lever 26, and that they are not outwardly stepped but are closely compacted for oscillatory movement in the interval 35 between the hub-portions 24, as later on further referred to. It is also observable that the hub-portions 24 are provided with diametrically opposed projections 36 each having an aperture 37 for attachment thereto of the inner end of aligned contractile springs 38, Fig. 1, the outer ends whereof are similarly connected at 39 to the medial rib or flange 40 interiorly of the respective brake-shoes 14, 15, as readily understandable from Figs. 1 and 2. Incidentally it is noteworthy, at this juncture, that the mating sheet metal elements of each actuator lever 26, 27 are suitably connected together as by welding, for example, to respectively constitute said levers into rigid units, as readily understood by those acquainted with the art Each fork end of both actuator levers 26, 27 is respectively provided with journal apertures 41, 41' in which are fitted annular rollers 42 afforded common rotary support on a bearing-pin 43; while it will be seen said apertures 41, 41' are equally spaced to each side of the axis of rotation of the wheel axle 11 on a line diametrically through said axis. The bearing-pin 43 includes a head 44 at one end with a diametric hole 45 proximately through the other end of said pin, for reception of a cotter-pin 46 whereby a washer 47 retains the several parts aforesaid in operative assembly. In other words, and as best understood from Fig. 2, the bearing-pin 43 is initially passed, by its apertured end, from one side of the respective fork ends into the bore of the roller 42, in the adjoining aperture 41, on through an inclined cam-slot 48, provided for the purpose, in the flange 40 of the associated brake-shoe 14 or 15 and thence by way of the bore of the spaced roller 42 in the fork end aperture 41, when the washer 47 is applied and the cotter-pin 46 inserted in the hole 45, whereby said parts are cooperatively assembled. It will be obvious the procedure just explained is similarly involved with the connection of each fork end of both actuator levers 26 and 27 to the respective brake-shoes 14, 15.

Referring again to the cam-slots 48, it is to be particularly observed that they are conveniently of rectangular contour, see Fig. 1, and that the pair associated with the actuator-lever 26 are in inclined parallel relation, while those associated with the actuator-lever 27 are similarly parallel but reversely inclined; whereas the angle of inclination of all of said cam-slots is preferably seventeen-degrees with respect to the vertical for a purpose hereinafter explained.

Figure 2:
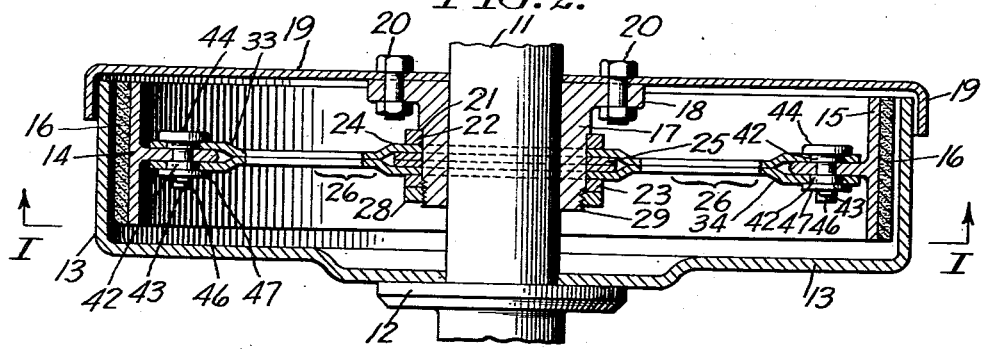
Fig. 2 is a diametric sectional view taken approximately on the plane indicated by the angled arrows II—II in Fig. 1.

The improved brake mechanism described is conveniently operated by a suitable force applying device, preferably a hydraulic motor such as typically indicated at 49, Fig. 1, said motor including opposedly-movable piston means 50, having rounded heads 51 in part engageable between the wedge-shaped sections 32, 32' and preferably proximate the outer ends of the confronting edges 52 thereof. The motor 49 is provided with a fluid pressure connection—not shown—whereby when the piston means 50 are opposingly moved outwards the respective heads 51 rock the actuator-levers 26, 27 on the bearing sleeve 17, as indicated by the dual-pointing curved arrow 53 shown in Fig. 1. As a result of such movement the respective bearing-pins 43 will be jointly and evenly shifted inwards of the associated cam slots 48, with concurrent and direct advancement outwards of the brake-shoes 14, 15 into uniform circumferential engagement of the lining elements 16 with the inner surface of the rotary brake-drum 13; such action being positively ensured by the specifically defined inclination of the cam-slots 48, and the cradle-like support afforded thereby to the brake-shoes through the medium of the several bearing-pins 43. It is also to be particularly remarked that by use of the annular rollers 42 and their mounting in the journal apertures 41, 41' all frictional grippage or binding as between the bearing-pin 43 and the inclined cam-slots 48 is positively eliminated; whereas when the fluid pressure is released from action on the piston means 50 of the hydraulic motor 49, the braking force of the shoes 14, 15 will be automatically withdrawn from the brake-drum 13, with concurrent retraction of said shoes inwardly to inactive position, irrespective of the direction of rotation of the axle 11, when such braking force was applied to the brake-drum 13. Still further the cradle-like connection of the brake-shoe bearing-pins 43 through the cam-slots, prevents the shoes 14, 15 from moving relatively up or down; while they are positively restrained against any lateral shifting with respect to the interior surface of the brake-drum 13, whereby the development of torsional strains is definitely eliminated.

Having thus described my invention, I claim:

1. In brake mechanism for vehicle wheels the combination with a rotary brake-drum, of a pair of brake-shoes each having an inwardly-directed web; opposed inter-engaging actuator-levers, pivotally supported by a common bearing sleeve on the wheel-axle with capacity for relative oscillation, each said lever comprising mating sheet metal elements having the respective ends expanded and apertured to define bearing-forks; pivot means in each actuator-lever bearing-fork; reversely inclined cam-slots in the brake-shoe respective inwardly-directed webs, through which the pivot means aforesaid pass; means whereby the actuator-levers are normally influenced to relatively collapsed position; and means for expanding said levers with joint and even inward movement of the pivot means in the inclined cam-slots, whereby the respective brake-shoes are directly advanced outwards into uniform circumferential contact with the brake-drum.

2. The invention of claim 1 wherein each element of one of the sheet metal actuator levers embodies a planarly-stepped hub-portion to define an interval therebetween; a pair of diametrically extending arms with a confronting wedge-shaped outset section at one end to jointly provide the bearing-fork and a plain outset at the other end to similarly provide the other bearing fork, and both of said forks are in the common plane of the hub-portion; and journal apertures through the respective fork ends equally spaced to each side and on a line diametrically through the axis of rotation of the vehicle wheel.

3. The invention of claim 1 wherein each element of the other of the actuator-levers embodies a medially located hub-portion with a pair of diametrically extending arms; and said arms have their outer end portions provided with coaxial apertures to define the bearing fork.

4. The invention of claim 1 wherein each pivot means comprises a bearing-pin, spaced annular rollers on said pin for rotative engagement in the associated actuator lever forked end, and means for retaining such bearing-pin and rollers in cooperative connection to the brake-shoe.

HOWARD WALKER.